US007529612B2

United States Patent
Chen et al.

(10) Patent No.: US 7,529,612 B2
(45) Date of Patent: May 5, 2009

(54) SPEEDOMETER AND MOTOR VEHICLE ARRANGEMENT

(75) Inventors: Kuo-Rong Chen, Panchiao (TW);
Chun-Chung Lee, Taipei (TW);
Cheng-Hung Huang, Miaoli Hsien (TW)

(73) Assignee: Sin Etke Technology Co., Ltd., Taipei (TW)

( * ) Notice: Subject to any disclaimer, the term of this patent is extended or adjusted under 35 U.S.C. 154(b) by 356 days.

(21) Appl. No.: 11/342,551

(22) Filed: Jan. 31, 2006

(65) Prior Publication Data

US 2007/0021897 A1    Jan. 25, 2007

(30) Foreign Application Priority Data

Jul. 25, 2005    (TW)    ............... 94125096 A

(51) Int. Cl.
*B60T 8/32* (2006.01)

(52) U.S. Cl. .................. 701/93; 701/70; 116/62.1; 116/47; 116/284; 116/285; 116/286; 116/287; 116/288; 324/139; 324/144; 324/143; 324/151 R; 74/12; D10/98; 235/95 R; 377/24.1; 702/165; 180/170; 123/350

(58) Field of Classification Search .............. 701/70, 701/93; 116/62.1, 47, 284–288; 74/12; 180/170; 123/350; D10/98; 324/139, 144, 143, 151 R; 235/95 R; 377/24.1
See application file for complete search history.

(56) References Cited

U.S. PATENT DOCUMENTS

| 3,800,139 | A | * | 3/1974 | Clark ................ 246/182 C |
|---|---|---|---|---|
| 3,892,134 | A | * | 7/1975 | Hewko ................ 74/12 |
| 3,892,135 | A | * | 7/1975 | Hewko ................ 74/12 |
| 3,977,256 | A | * | 8/1976 | Wernstedt ............... 188/181 A |
| 4,006,643 | A | * | 2/1977 | Hewko ................ 74/12 |
| 4,136,331 | A | * | 1/1979 | Cullen ................ 180/170 |
| 4,560,365 | A | * | 12/1985 | Weaver ................ 464/52 |
| 4,569,027 | A | * | 2/1986 | Nakano et al. ............. 702/147 |
| 4,648,366 | A | * | 3/1987 | Thornton-Trump ......... 123/335 |
| 4,651,593 | A | * | 3/1987 | Aoki et al. .................. 477/65 |
| 4,841,902 | A | * | 6/1989 | Gubin ................ 116/62.4 |
| 4,858,135 | A | * | 8/1989 | Clish et al. ................ 701/93 |
| 5,291,126 | A | * | 3/1994 | Murase ................ 324/144 |
| 5,357,451 | A | * | 10/1994 | Beaudry et al. .............. 702/88 |
| 5,659,290 | A | * | 8/1997 | Haeri ................ 340/441 |
| 7,034,495 | B2 | * | 4/2006 | Sasaki ................ 318/685 |
| 2004/0133394 | A1 | * | 7/2004 | Huang et al. ............... 702/182 |
| 2004/0221790 | A1 | * | 11/2004 | Sinclair et al. ............. 116/62.1 |

OTHER PUBLICATIONS

Terf Inc. SpeedChanger; http://www.terf.com/Data/SPEED%20-CHANGER%20CALIBRATION%20MANUAL%20TERF%20-102302.PDF.*

* cited by examiner

*Primary Examiner*—Khoi Tran
*Assistant Examiner*—Jorge O Peche
(74) *Attorney, Agent, or Firm*—Bacon & Thomas, PLLC

(57) ABSTRACT

A speedometer includes a function storage device, which has stored therein four conversion functions, a selector, which provides four options corresponding to the four conversion functions in the function storage device, and a microprocessor, which counts pulse signals sent by the sensor device of the motor vehicle to obtain a counted total value, selects the corresponding conversion function from the function storage device corresponding to the option selected through the selector according to the quantity of poles (two, four, eight or sixteen) on the drive shaft of the motor vehicle, and puts the counted total value into the selected conversion function for calculation to obtain a car speed value.

7 Claims, 5 Drawing Sheets

| dip switches 212 | the number of sensor device | converion function | modified parameter 305 |
|---|---|---|---|
| 00 | 2 | $\frac{N}{2} \times 2\pi r$ — 301 | x 0.8 |
| 01 | 4 | $\frac{N}{4} \times 2\pi r$ — 302 | x 0.9 |
| 10 | 8 | $\frac{N}{8} \times 2\pi r$ — 303 | x 1.1 |
| 11 | 16 | $\frac{N}{16} \times 2\pi r$ — 304 | x 1.2 |

SPEEDOMETER AND MOTOR VEHICLE ARRANGEMENT

BACKGROUND OF THE INVENTION

1. Field of the Invention

The present invention relates to a speedometer and, more particularly, to a speedometer with selector that fits different motor vehicles.

2. Description of Related Art

Currently, the method of counting the speed of a motor vehicle varies with the number of poles arranged on the crankshaft or drive shaft. The number of poles in regular motor vehicles includes four designs, i.e., two, four, eight and sixteen. Different speedometers must be used to fit different pole number designs. These different speedometers are not compatible. Therefore, the speedometer for one motor vehicle may be not suitable for another motor vehicle. It is inconvenient for manufacturers and motor vehicle users to check the compatibility of the speedometer before installation. Because every speedometer manufacturer needs to produce many different types of speedometers to fit different motor vehicles, the inventory control is complicated.

SUMMARY OF THE INVENTION

The present invention has been accomplished under the circumstances in view. The invention provides a speedometer installed in a motor vehicle. The motor vehicle comprises at least one revolving shaft, a predetermined quantity of poles equiangularly arranged around the periphery of said at least one revolving shaft, and a sensor device adapted to detect said poles and to output one pulse signal when detected one of the poles. The predetermined quantity is selected from one of the quantity-group of two, four, eight and sixteen. The speedometer comprises a function storage device, which has stored therein at least two conversion functions respectively corresponding to at least two of the aforesaid quantity-group, a selector, which provides at least two options respectively corresponding to the at least two conversion functions in the function storage device for selection, and a microprocessor, which is electrically connected to the function storage device and the sensor device and adapted to receive and count pulse signals sent by the sensor device during running the at least one revolving shaft of the motor vehicle so as to obtain a counted total value. The microprocessor selects a corresponding conversion function from the at least two conversion functions of the function storage device subject to the option selected through the selector, and then puts the counted total value into the selected corresponding conversion function for calculation to obtain a car speed value.

By means of operating the selector to select one of the four options, the speedometer fits any of a variety of motor vehicles that is provided with two, four, eight or sixteen poles. Because manufacturers need only to prepare one type of speedometers, the inventory control becomes easier.

The motor vehicle further comprises a display device electrically connected to the microprocessor and controlled by the microprocessor to show the car speed value. The display device can be a LCD display, seven-segment display, LED display, and so on.

Further, the selector can use a set of dip switches, a rotary switch, or a software to control the selection of the options.

BRIEF DESCRIPTION OF THE DRAWINGS

FIG. 3 is a content table showing the storage content of the function storage device according to the present invention.

DETAILED DESCRIPTION OF THE PREFERRED EMBODIMENT

Figure 1:
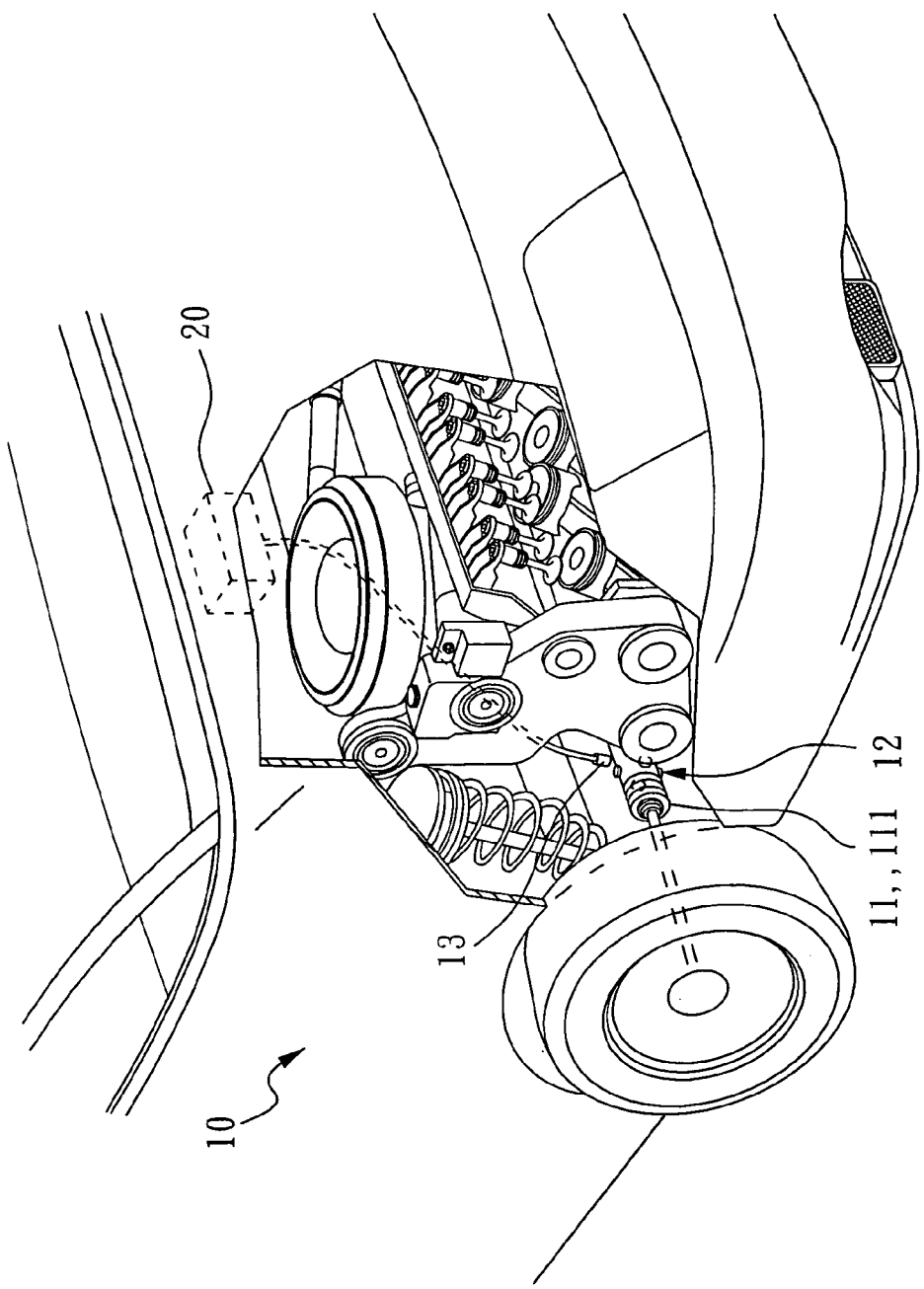
FIG. 1 is a perspective view of a part of a motor vehicle showing the installation of a speedometer according to the present invention.

Referring to FIG. 1, a speedometer 20 is installed in a revolving shaft 11 of a motor vehicle 10. According to this embodiment, the revolving shaft 11 is the front wheel drive shaft 111 of the motor vehicle 10. A predetermined quantity of magnetic poles 12 are fixedly mounted on the revolving shaft 11 and equiangularly spaced around the periphery of the revolving shaft 11. The motor vehicle 10 has installed therein a magnetic induction sensor device 13 corresponding to the magnetic poles 12. When the engine of the motor vehicle 10 starts to rotate the revolving shaft 11, the sensor device 13 detects the magnetic poles 12 and outputs one pulse signal when detecting one of the magnetic poles 12. The aforesaid predetermined quantity can be one of the following quantities: two, four, eight or sixteen. The number of the magnetic poles in conventional motor vehicles is selected from the aforesaid different quantities. According to this embodiment, there are four magnetic poles 12 equiangularly arranged around the periphery of the revolving shaft 11.

Figure 2:
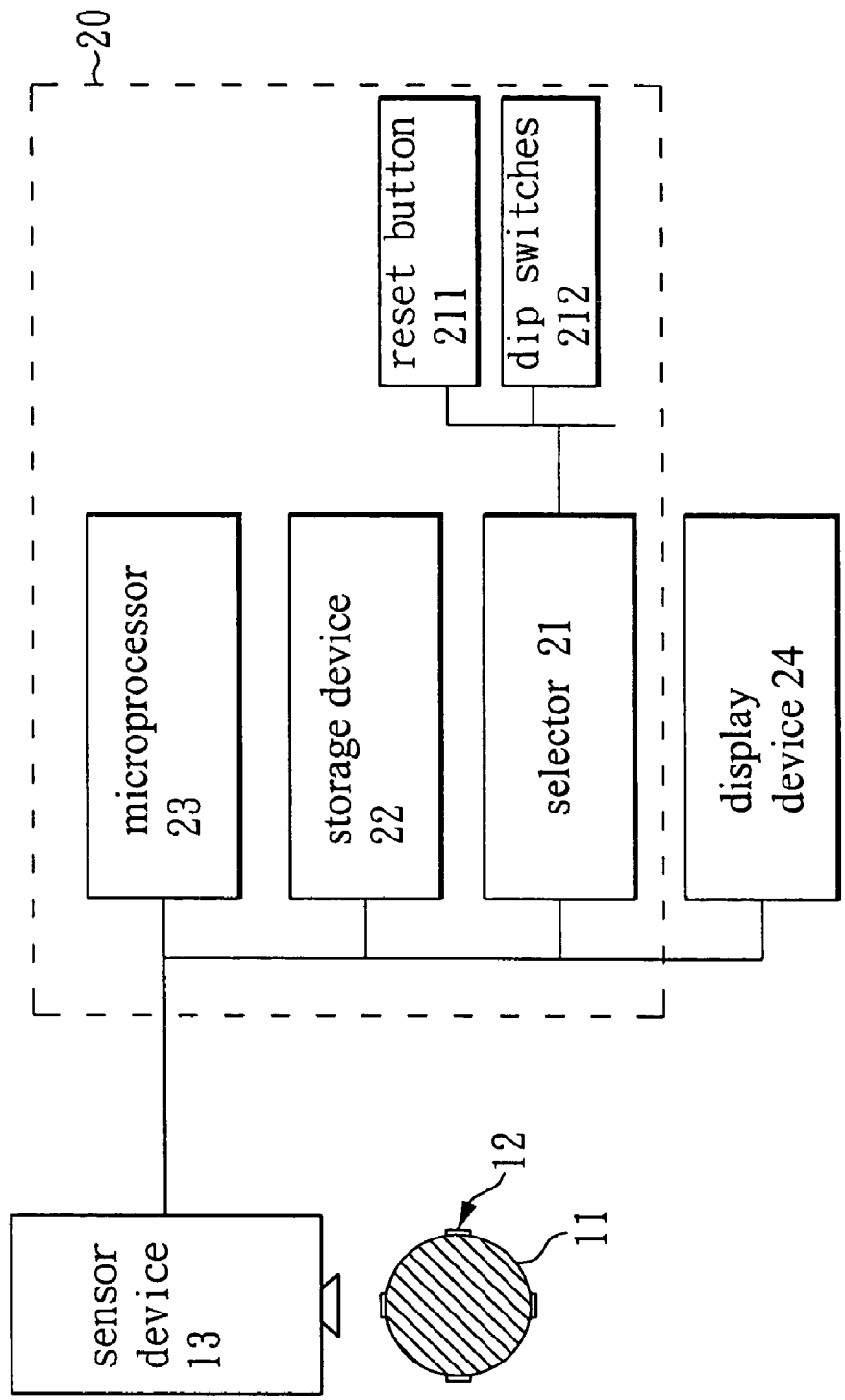
FIG. 2 is a system block diagram of the present invention.

FIG. 2 is a system block diagram of the present invention. The speedometer 20 comprises a function storage device 22, a selector 21, and a microprocessor 23. The function storage device 22 has stored therein four conversion functions corresponding to the aforesaid quantity-group. The selector 21 comprises a set of dip switches 212 and a reset button 211.

Referring to FIG. 3 and FIG. 2 again, FIG. 3 is a content table showing the storage content of the function storage device according to the present invention. The dip switches 212 provide four optional status, i.e., 00, 01, 10 and 11 corresponding to the four conversion functions 301, 302, 303, and 304 stored in the function storage device 22. The microprocessor 23 is respectively electrically connected to the selector 21, the function storage device 22 and the sensor device 13, and adapted to receive and count pulse signals sent by the sensor 13 so as to obtain a counted total value N. When switched the dip switches 212 of the selector 21 to show status 01, the microprocessor 23 immediately selects the corresponding conversion function 302: $N/4 \times 2\pi\gamma$ from the function storage device 22, and then puts the counted total value N into the conversion function 302 for calculation so as to obtain a car speed value, and therefore the current actual car speed is obtained. In the aforesaid conversion function 302: $N/4 \times 2\pi\gamma$, $\pi$ is the Ludolphian number, and $\gamma$ is the radius of the tires of the motor vehicle 10.

The function storage device 22 has further stored therein a modified parameter 305. The microprocessor 21 can modify the aforesaid car speed value according to the modified parameter 305. For example, the conversion function 302 is multiplied by the factor of 0.9 or even 0.8 when the tires start to wear after a long use, or multiplied by the factor of 1.1 or even 1.2 when relatively larger tires are used to substitute for the old tires, so that the modified car speed value can be the actual speed of the motor vehicle.

The conversion functions and modified parameter stored in the function storage device 22 may be prepared in other forms. Every motor vehicle provider can design a respective computation formula and modified parameter to fit different motor vehicles.

Figure 4B:
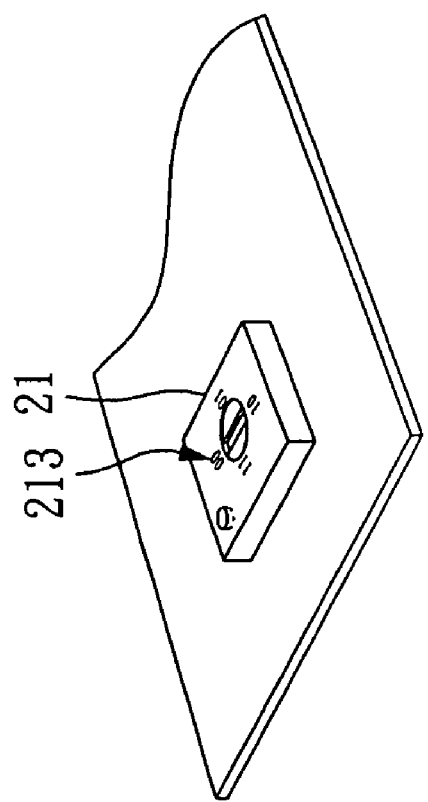
FIG. 4b is a schematic drawing showing an alternate form of the selector according to the present invention.
Figure 4A:
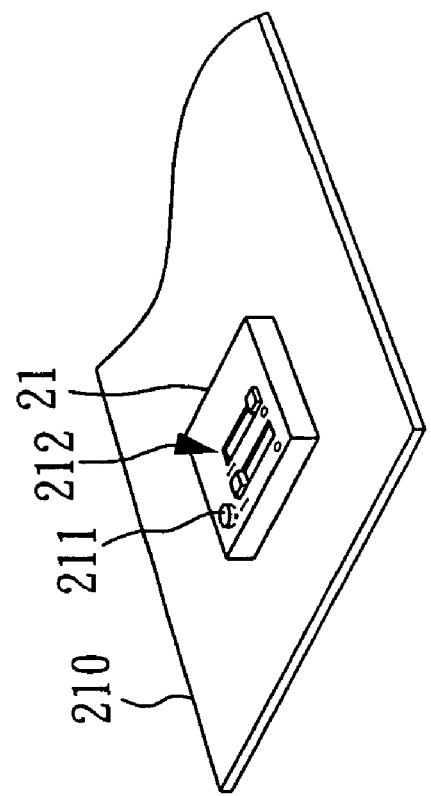
FIG. 4a is a schematic drawing showing the arrangement of the selector according to the present invention.

FIG. 4a is a schematic drawing showing the arrangement of the selector according to the present invention, and FIG. 4b is a schematic drawing showing an alternate form of the selector according to the present invention. Referring to FIG. 4a, the selector 21 is installed in a main board 210, comprising a set of dip switches 212 and a reset button 211. The motor vehicle provider or the user of the motor vehicle can operate the dip switches 212 to show one of the four status: 00, 01, 10 and 11. Further, when pressed the reset button 211, the selector 21 outputs a reset signal to the microprocessor 21, causing the counted total value N of the microprocessor 21 to zero.

According to FIG. 4b, the selector 21 uses a rotary switch 213 to substitute for the aforesaid dip switches 212. The user can selectively rotate the rotary switch 213 to one of four different angular positions to show one of the four statuses: 00, 01, 10 and 11.

The selector shown in FIG. 4a and the selector shown in FIG. 4b both are manual selection switches convenient for operation by the motor vehicle provider or user.

Figure 5:
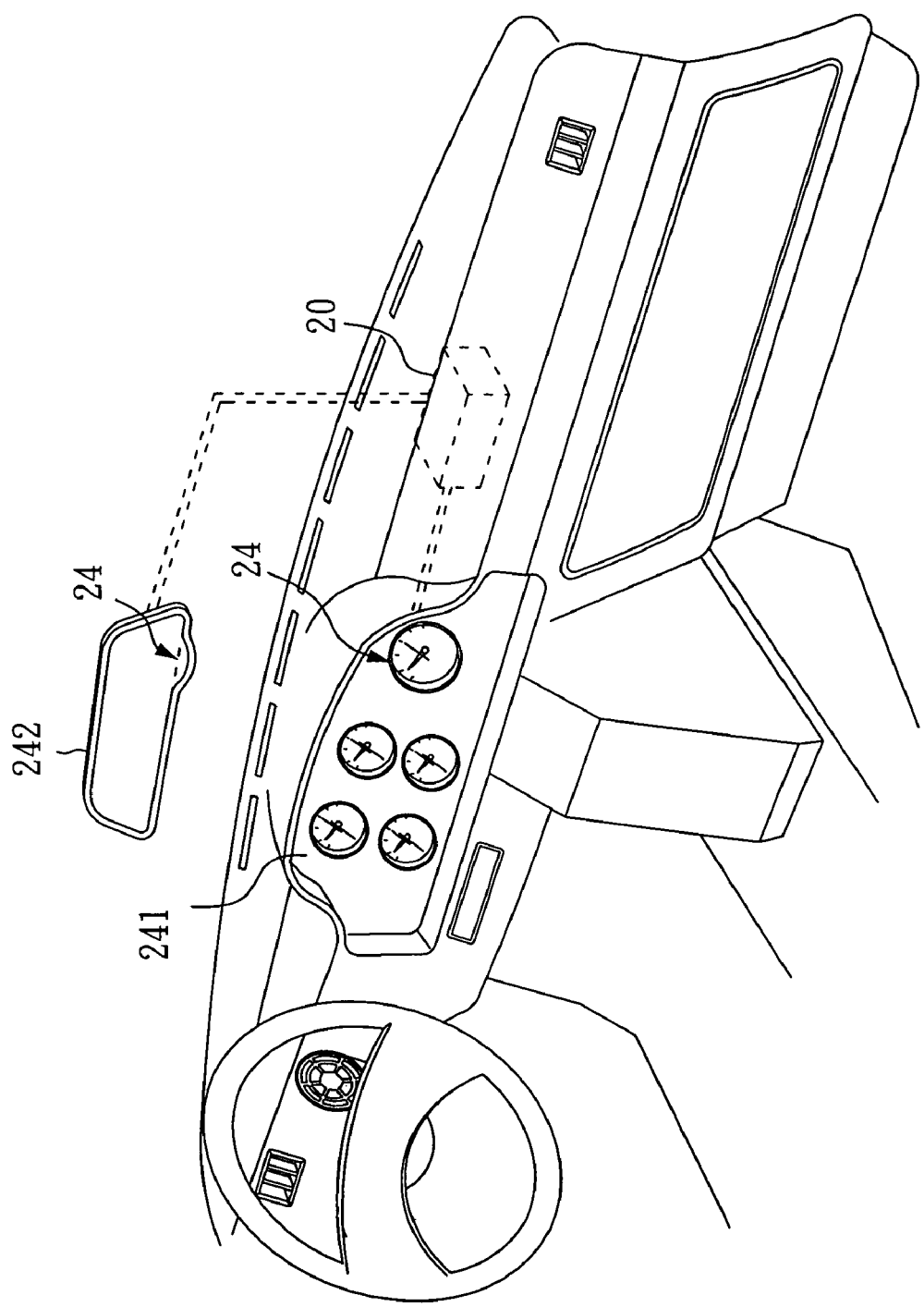
FIG. 5 is a schematic drawing showing the installation examples of the display device inside the motor vehicle according to the present invention.

FIG. 5 is a schematic drawing showing the installation examples of the display device inside the motor vehicle according to the present invention. Referring to FIG. 5, a display device 24 is electrically connected to the microprocessor 23 of the speedometer 20, and controlled by the microprocessor 23 to show the calculated actual car speed for driver. The display device 24 can be a LCD display that can be installed in the dashboard 241 or the rearview mirror 242 inside the motor vehicle, or any of a variety of suitable locations where the car driver can easily see what is displayed on the display device 24.

Although the present invention has been explained in relation to its preferred embodiments, it is to be understood that many other possible modifications and variations can be made without departing from the spirit and scope of the invention as hereinafter claimed.

What is claimed is:

1. A speedometer and motor vehicle arrangement comprising a motor vehicle and a speedometer installed in said motor vehicle, said motor vehicle comprising at least one revolving shaft, a predetermined quantity of poles equiangularly arranged around the periphery of said at least one revolving shaft, and a sensor device adapted to detect said poles and to output one pulse signal when detected one of said poles, said predetermined quantity being selected from one of the quantity-group of two, four, eight and sixteen;

wherein said speedometer comprising:
a function storage device having stored therein at least two conversion functions respectively corresponding to at least two of said quantity-group;
a selector providing at least two options respectively corresponding to said at least two conversion functions in said function storage device for selection; and
a microprocessor electrically connected to said function storage device and said sensor device and adapted to receive and count pulse signals sent by said sensor device during running the at least one revolving shaft of said motor vehicle so as to obtain a counted total value;
wherein said microprocessor selects a corresponding conversion function from the at least two conversion functions of said function storage device subject to the option selected through said selector, and then puts said counted total value into the selected corresponding conversion function for calculation to obtain a car speed value, said function storage device has further stored therein a modified parameter that is multiplied by said conversion function when a tire wears after a long use or a large tire is used to substitute for an old tire such that said microprocessor modifies said car speed value subject to said modified parameter to obtain the actual speed of said motor vehicle.

2. The speedometer and motor vehicle arrangement as claimed in claim 1, wherein said motor vehicle further comprises a display device electrically connected to said microprocessor and controlled by said microprocessor to show said car speed value.

3. The speedometer and motor vehicle arrangement as claimed in claim 1, wherein said selector further comprises a reset button, which outputs a reset signal to said microprocessor to zero said counted total value when said rest button is pressed.

4. The speedometer and motor vehicle arrangement as claimed in claim 1, wherein said car speed value is the actual speed of said motor vehicle.

5. The speedometer and motor vehicle arrangement as claimed in claim 1, wherein said at least one revolving shaft comprises a drive shaft adapted to rotate vehicle wheels of said motor vehicle.

6. The speedometer and motor vehicle arrangement as claimed in claim 1, wherein the at least two options provided by said selector include four options.

7. The speedometer and motor vehicle arrangement as claimed in claim 1, wherein said selector comprises a set of dip switches.

* * * * *